(12) United States Patent
Arnold

(10) Patent No.: US 6,666,649 B2  
(45) Date of Patent: Dec. 23, 2003

(54) HELICOPTER INDIVIDUAL BLADE CONTROL SYSTEM

(75) Inventor: Uwe Arnold, Kassel (DE)

(73) Assignee: ZF Luftahrttechnik GmbH, Calden (DE)

(*) Notice: Subject to any disclaimer, the term of this patent is extended or adjusted under 35 U.S.C. 154(b) by 50 days.

(21) Appl. No.: 10/147,611

(22) Filed: May 16, 2002

(65) Prior Publication Data

US 2002/0187041 A1 Dec. 12, 2002

(30) Foreign Application Priority Data

May 23, 2001 (DE) .......................... 101 25 178

(51) Int. Cl.⁷ .............................. B64C 27/605
(52) U.S. Cl. .................. 416/114; 416/153; 416/168 R
(58) Field of Search .................. 416/112, 113, 416/114, 115, 153, 168 R

(56) References Cited

U.S. PATENT DOCUMENTS

| | | | |
|---|---|---|---|
| 3,570,786 A | 8/1969 | Lewis | 244/17.13 |
| 4,243,358 A | 1/1981 | Carlock et al. | 416/114 |
| 5,310,315 A | 5/1994 | Lafortune et al. | 416/114 |
| 5,655,878 A | * 8/1997 | Yamakawa et al. | 416/114 |

FOREIGN PATENT DOCUMENTS

| | | | |
|---|---|---|---|
| DE | 2 039 101 | 10/1972 | B64C/27/54 |
| DE | 26 25 327 | 12/1976 | F15B/13/02 |
| DE | 29 41 258 C2 | 12/1987 | B64C/27/72 |
| DE | 692 05 810 T2 | 6/1996 | B64C/27/72 |

OTHER PUBLICATIONS

Blaas, Dipl.–Ing. Achim, "Design and Examination of an Active Rotor Blade Control", *BMFT Final Report*, Dec. 1990, pp. 13–18.

* cited by examiner

Primary Examiner—Edward K. Look  
Assistant Examiner—Richard A. Edgar  
(74) Attorney, Agent, or Firm—Davis & Bujold, PLLC

(57) ABSTRACT

In an individual rotor blade control device for a helicopter main rotor with a rotor shaft that can be driven by a main drive, with an even number of rotor blades that are arranged on the periphery of a rotor hub, with primary control mechanisms for collective and sinusoidal, cyclic rotor blade adjustment, which include a transfer element for the control movements from a non-rotating system to a rotating system and with actuators that are individually allocated to the rotor blades, wherein the actuator control movement is superimposed onto the control movement of the primary control mechanisms and each actuator is equipped with a safety device in order to bring the actuator into its final position and keep it there, if necessary, it is suggested that the setting angle change of one half of the rotor blades have an opposed direction due to the securing of the actuators in their final positions, like the setting angle change of the other half of rotor blades, and that the rotor blades of each half be distributed on the periphery in such a way that no pitching moments that could affect the rotor are generated.

6 Claims, 3 Drawing Sheets

HELICOPTER INDIVIDUAL BLADE CONTROL SYSTEM

FIELD OF THE INVENTION

The invention relates to an individual rotor blade control device.

BACKGROUND OF THE INVENTION

Conventional control devices for helicopter main rotors include a swash plate for transmitting the pilot's control movements from the non-rotating system of the helicopter cabin to the main rotor system, which turns during operation. The swash plate can tilt to all sides for sinusoidal, monocyclic rotor blade adjustment and is axially displaceable for collective rotor blade adjustment. The swash plate, which serves as the primary control means, is actuated by several control elements or control rods arranged beneath the swash plate.

Low vibration levels, better flight performance and lower noise level emission can be achieved by superimposing additional blade angle modifications on the collective and sinusoidal, monocyclic blade angle adjustment, e.g. in order to counteract rotor blade induced oscillation. For this purpose, actuators that are individually allocated to the rotor blades are provided, with the actuators' control movement being superimposed on the control movement of the swash plate. For safety reasons each actuator contains a safety device in order to bring it into a specified position and keep it there, as required. The actuators can be arranged, for example, between the rotating part of the swash plate and the connections of the individual rotor blades—the linkages. If they are blocked by safety devices, they act like simple control rods so that the control movements of the swash plate can be transmitted reliably even when the actuators are switched off.

In Blaas, icebreaker, "Aufbau und Untersuchung einer aktiven Rotorblattsteuerung" [Design and Examination of an Active Rotor Blade Control, BMFT Final Report, December 1990], apparent is a hydraulic actuator equipped with a spring acting in the adjusting direction, serving the purpose of bringing the actuator, as necessary, into a final position and holding it there. This actuator is characterized by a simple design. The disadvantage of the system securing it in a final position is that all actuators assume their final positions when the safety device is triggered and thus all rotor blades are subject to the same change in the blade angle. This so-called universal jump affects a sudden change in the thrust generated by the helicopter main rotor, which is problematic in particular when flying close to the ground.

For this reason actuators were developed that contain a safety device, which keeps the actuator in a centered position when the safety device has been triggered. The design of these actuators is more complex, and they weigh more.

SUMMARY OF THE INVENTION

The invention is based on the task of equipping the individual rotor blade control device with actuators of a simple design, where the negative effects of a universal jump are avoided.

This task is resolved by the rotor blade control device. Although, due to the opposed setting of the blade angle rate, which result from the actuators being in their final positions, different lifting values are generated on the individual rotor blades, and an accordingly deviating track. Relative to the entire rotor, the flight mechanical effects of the individual blade angle changes are mutually compensating.

In an advantageous design of the invention, the setting angle changes of adjacent rotor blades are of an opposed direction as a result of securing the actuators in their final positions so that alternating setting angle changes occur from blade to blade. In the case of more than six rotor blades, different distributions of the rotor blades also fulfill the criterion of mutually compensating for flight mechanical effects, i.e. avoiding peripheral pitching moments. The only thing that must be ensured is that half the rotor blades be adjusted in the opposed directions due to the securing of the actuators and that, additionally, all rotor blades that are set in one direction are distributed among sub-groups that are evenly distributed at the periphery. In the simplest case, i.e. from blade to blade alternating angle of reflection, these sub-groups consist of only one rotor blade each.

In another design of the invention, each actuator is designed as a linear actuator with two sub-assemblies which can move in relation to each other, wherein each sub-assembly has a coupling point and that the coupling points have a minimum distance in a first final position and a maximum distance in a second final position. Nevertheless, the invention can basically also be implemented with other actuator designs, such as, for example, rotating actuators.

In a further development of the invention, two actuator designs are used, wherein adjacent to a rotor blade with one actuator, which can be fastened in the first final position, a rotor blade with an actuator, which can be fastened in the second final position, is arranged. In this design, the connections of the actuators on the swash plate or on the individual rotor blades can have the same design for each rotor blade. It is also possible, however, to use actuators with the same design, which can all be fastened in the same final position and affect the opposed setting angle change by equipping half of the actuators with a turning element.

In one design of the invention, the safety device includes a pre-stressed element that can be expanded parallel to the adjusting direction of the actuator, e.g. a spring, which is arranged between the two sub-assemblies, which are movable in relation to each other, of the actuator and which serves the purpose of bringing the sub-assemblies into a final position and holding them there. Instead of a spring, a pre-stressed gas operated storage can also be used.

BRIEF DESCRIPTION OF THE DRAWINGS

The invention will now be described, by way of example, with reference to the accompanying drawings in which.

DETAILED DESCRIPTION OF THE INVENTION

Figure 1:
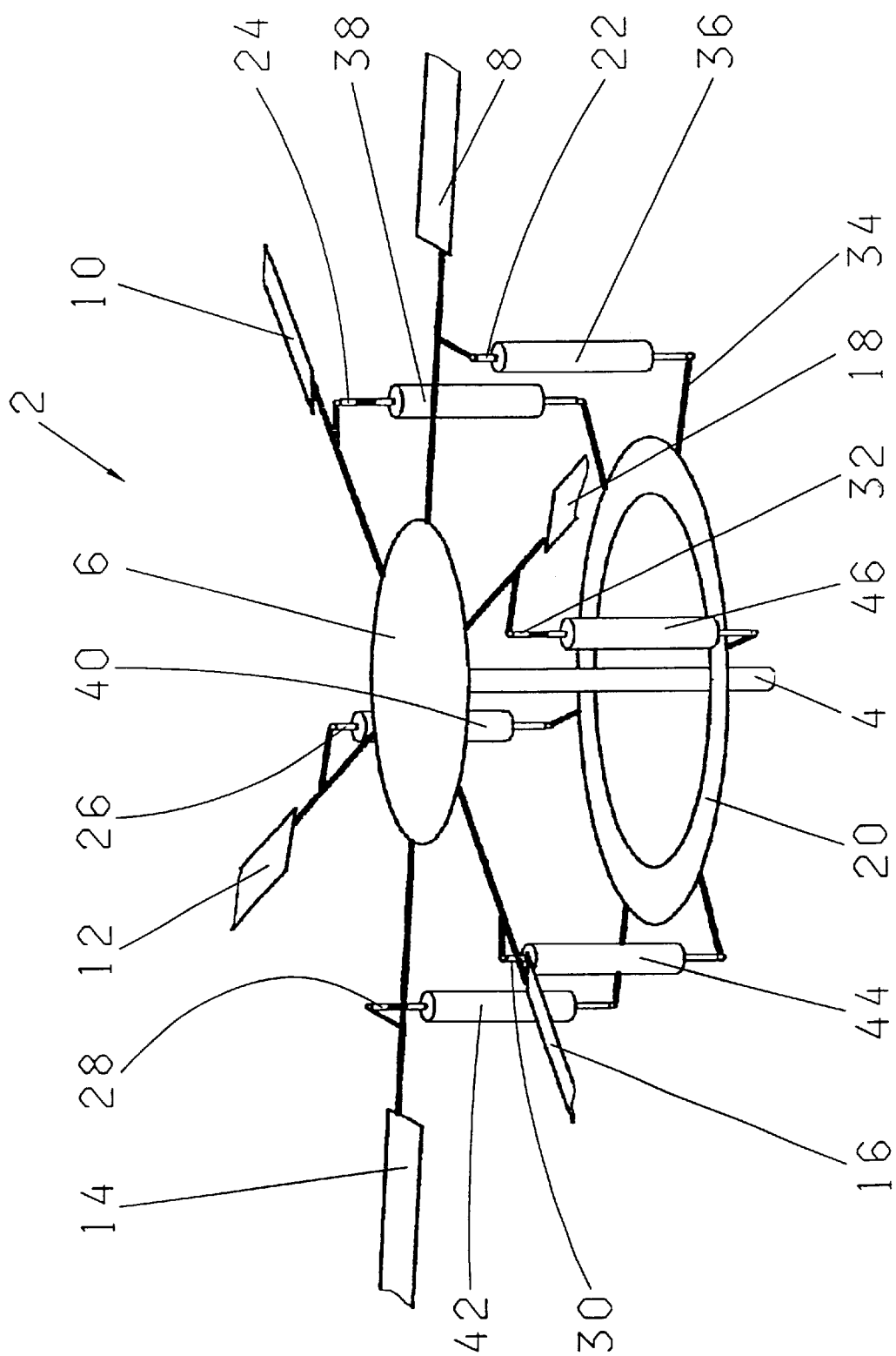
FIG. 1 is a rotor head with six actuators that are held in alternating final positions.

FIG. 1 shows a helicopter main rotor 2. The rotor shaft 4, which can be driven by a main drive that is not depicted, carries a rotor hub 6, on whose periphery six rotor blades 8, 10, 12, 14, 16, 18 are evenly distributed.

For collective and monocyclic rotor blade adjustment a swash plate 20 is provided, which can be displaced by control elements that are not depicted in relation to the rotor shaft in a linear fashion and can be tilted in all directions. On the rotating part 20 of the swash plate shown, a coupling point 34, respectively, is provided for each rotor blade 8, 10, 12, 14, 16, and 18. The setting angle of each rotor blade can be controlled by position controlling a vertical movement on the allocated linkage 22, 24, 26, 28, 30, 32. Between the linkages 22, 24, 26, 28, 30, 32 and the coupling points 34 on the swash plate 20, a linear actuator 36, 38, 40, 42, 44, 46, respectively, is arranged. These linear actuators replace the control rods, as they are arranged in conventional helicopter rotor heads without individual rotor blade control. The actuators 36, 38, 40, 42, 44, 46 on one hand serve as transfer elements for the collective and sinusoidal, monocyclic control movements, which are controlled by the swash plate 20, and can also change their length so that additional control movements with greater harmony can be generated.

Each actuator 36 through 46 is equipped with a safety device, which brings the actuator into a final position and keeps it there, as necessary. When the actuators are secured in a final position, they basically serve as rigid control rods, and the helicopter can be controlled through the swash plate 20, even if a malfunction in the system for the individual rotor blade adjustment should occur.

FIG. 1 depicts a state in which the rotor blades 8, 12, 16 form a group for which the setting angle changes have the same direction due to the securing of the actuators in their final positions. The individual rotor blades 8, 12, 16 of this group are evenly distributed at the periphery of the rotor hub. The rotor blades 10, 14, 18 form a second group of rotor blades, whose rotor blades have opposed directions due to the securing of the actuators 38, 42, 46 in their final positions. The rotor blades of this second group are distributed evenly at the periphery as well so that no pitching moments are applied onto the rotor. The amounts of positive setting angle changes of the first group of rotor blades and of negative blade angle changes of the second group of rotor blades are such that the positive and negative thrust portions resulting from the blade angle changes largely compensate each other. A universal jump, which would cause a sudden change in thrust of the rotor, will not take place so that the actuators can be secured without risk even during flight maneuvers close to the ground.

Figure 2:
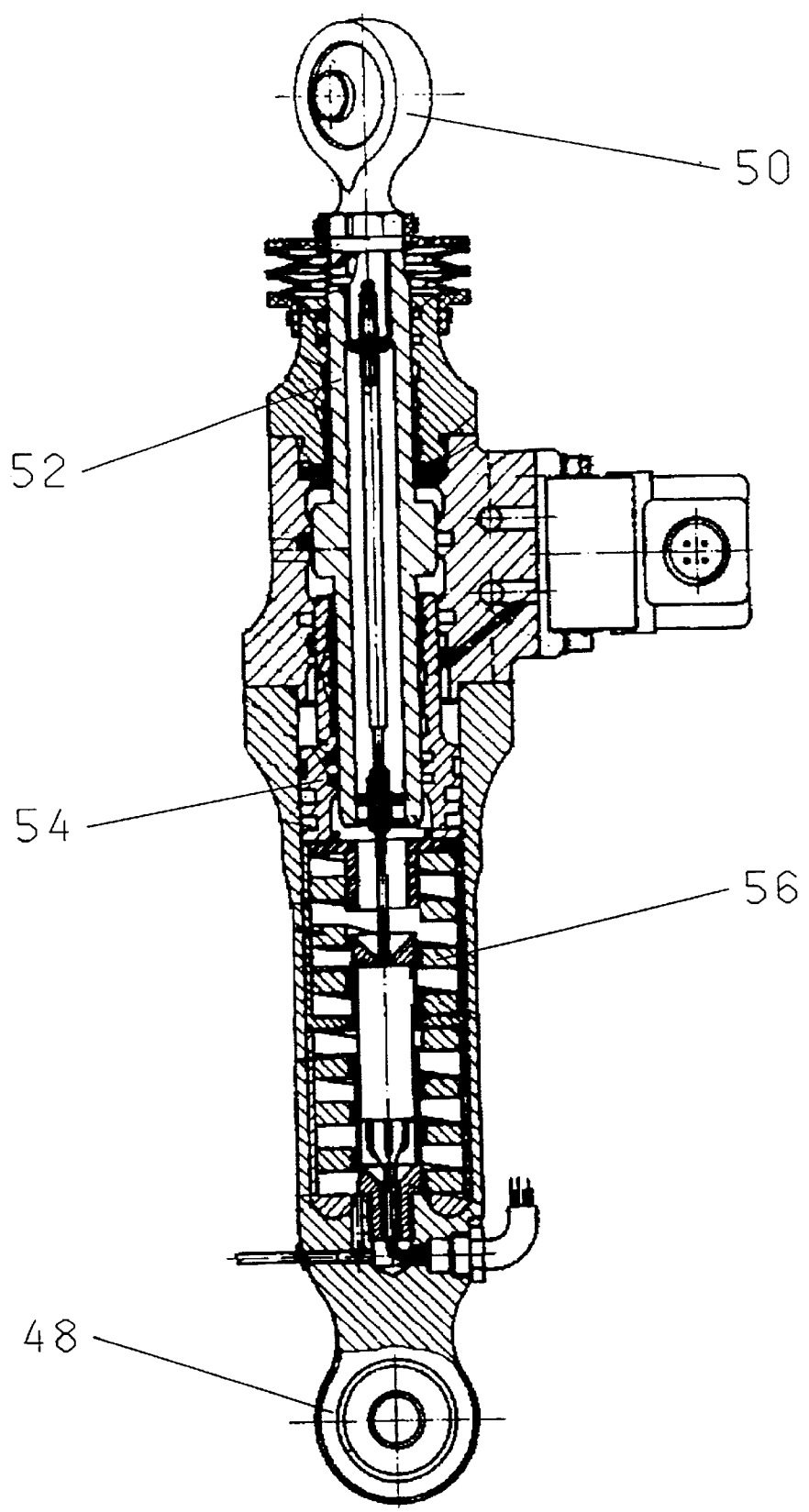
FIG. 2 is a section view of an actuator held in a final position.

FIG. 2 shows a section view of an actuator, which can be secured in a final position. In this FIG. 48 represents the coupling to the swash plate and 50 the coupling to the linkage. The working piston 52 can be provided with hydraulic pressure so that the supplied or removed pressure medium volume results in a change in distance between the two connections 48, 50. Should the actuator be secured in a final position, the securing piston 54 is shifted by a spring 56, wherein the actuator assumes its final position. Such an actuator with a final position safety device has a simpler design compared to an actuator with a so-called center lock and is therefore smaller and lighter.

Figure 3A:
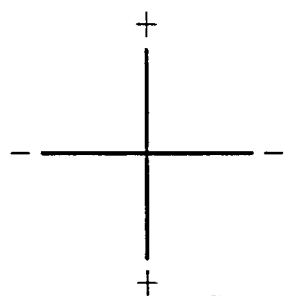
FIGS. 3A to 3G the possible final position configurations for rotor heads with four, six, eight and twelve rotor blades.
Figure 3B:
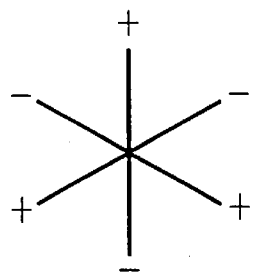
Figure 3C:
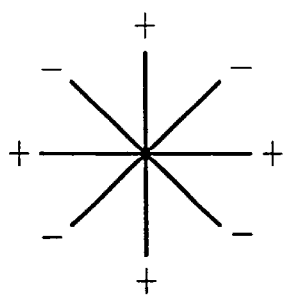
Figure 3D:
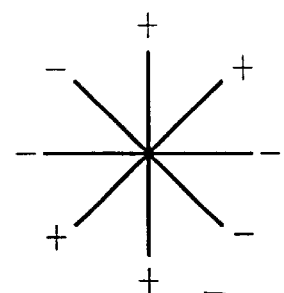
Figure 3E:
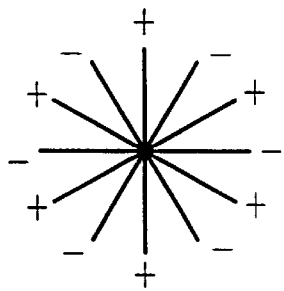
Figure 3F:
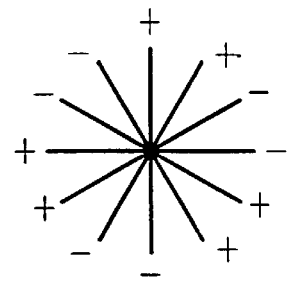
Figure 3G:
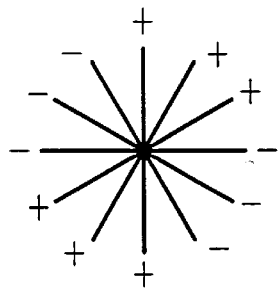

The final position configuration of the rotor blades shown in FIG. 1 is shown in a top view in FIG. 3B. There, a positive final position (+) is arranged adjacent to a negative final position (−), respectively. Also in the example, shown in FIG. 3A, with four rotor blades, an alternating final position configuration is the only possible solution in which no peripheral pitching moments are transmitted to the rotor head. In the case of eight rotor blades there are already two solutions (FIGS. 3C, 3D) and in the case of twelve rotor blades there are as many as three possible solutions. In the case of even-numbered blades above four, the alternating final position configuration (see FIGS. 3C, 3E) always meets the requirements. In the case of even-numbered blades above six, it is also possible to form rotor blade sub-groups, which comprise more than one rotor blade and are evenly distributed on the periphery of the rotor hub, wherein neighboring sub-groups have opposed directions of the blade angle adjustment. In the case of eight rotor blades (FIG. 3D), these sub-groups comprise two rotor blades, respectively. With twelve rotor blades, these sub-groups can comprise two (FIG. 3F) or three rotor blades (FIG. 3G), respectively.

| | |
|---|---|
| 2 | rotor head |
| 4 | rotor shaft |
| 6 | rotor hub |
| 8, 10, 12, 14, 16, 18 | rotor blade |
| 20 | swash plate (rotating part) |
| 22, 24, 26, 28, 30, 32 | linkage |
| 34 | connection |
| 36, 38, 40, 42, 44, 46 | actuator |
| 48 | connection |
| 50 | connection |
| 52 | main piston |
| 54 | securing piston |
| 56 | spring |

What is claimed is:

1. An individual rotor blade control device for a helicopter main rotor (2) having a rotor shaft (4) driven by a main drive, with an even number of at least four rotor blades (8, 10, 12, 14, 16, 18) evenly distributed on the periphery of a rotor hub (6), comprising a primary control means (20) for collective and sinusoidal, cyclic rotor blade adjustment, which includes a transfer element for the control movements from a non-rotating system to a rotating system and actuators (36, 38, 40, 42, 44, 46) individually allocated one to each rotor blade (8, 10, 12, 14, 16, 18), wherein actuator control movement is superimposed onto the control movement of the primary control means (20) and each actuator is equipped with a safety device (54, 56) to bring the actuator into its final position and keep it there, if necessary, wherein half the rotor blades (8, 12, 16) are assigned to a first group of rotor blades and half the rotor blades (10, 14, 18) are assigned to a second group of rotor blades, the actuators when secured in their final positions provide angle changes of the first group of rotor blades (8, 12, 16) opposite in direction to the blade angle changes of the second group of rotor blades (10, 14, 18), and that each said group of rotor blades consists of at least two sub-groups (8, 12, 16; 10, 14, 18) evenly distributed on the periphery, with adjacent sub-groups being allocated to different said groups.

2. The rotor blade control device of claim 1, wherein the sub-groups (8, 12, 16; 10, 14, 18), respectively, comprises only one rotor blade so that the setting angle changes of adjacent rotor blades have opposed directions due to the securing of the actuators in their final positions.

3. The rotor blade control device of claim 1, wherein each of the actuators (36 through 46) is a linear actuator with two sub-assemblies that can move in relation to one another, wherein each sub-assembly contains a connecting point (48, 50) and the connecting points have a minimum distance in a first final position and a maximum distance from each other in a second final position.

4. The rotor blade control device according to claim 3, wherein to the rotor blades (8, 12, 16) of the first group actuators (36, 40, 44) are allocated, which can be held in the first final position, and that to the rotor blades (10, 14, 18) of the second group actuators (38, 42, 46) are allocated, which can be held in the second final position.

5. The rotor blade control device of claim 3, wherein the safety device is equipped with a pre-stressed element (56), which can be expanded parallel to the adjusting direction of the actuator, arranged between the two sub-assemblies of the actuator that can move in relation to one another and serves the purpose of bringing the sub-assemblies into a final position and holding them there.

6. The rotor blade control device of claim 5, wherein the prestressed element is a spring (56).

* * * * *